(12) United States Patent
Jordan

(10) Patent No.: US 9,394,931 B2
(45) Date of Patent: Jul. 19, 2016

(54) CLAMP ASSEMBLY

(71) Applicant: Kee Safety Limited, West Midlands (GB)

(72) Inventor: Matthew Jordan, Yorkshire (GB)

(73) Assignee: KEE SAFETY LIMITED, West Midlands (GB)

( * ) Notice: Subject to any disclaimer, the term of this patent is extended or adjusted under 35 U.S.C. 154(b) by 80 days.

(21) Appl. No.: 13/799,548

(22) Filed: Mar. 13, 2013

(65) Prior Publication Data

US 2013/0243522 A1 Sep. 19, 2013

(30) Foreign Application Priority Data

Mar. 15, 2012 (GB) .................................. 1204607.4

(51) Int. Cl.
*F16B 2/12* (2006.01)
*F16B 7/04* (2006.01)

(52) U.S. Cl.
CPC .................. *F16B 2/12* (2013.01); *F16B 7/0493* (2013.01); *Y10T 403/3906* (2015.01)

(58) Field of Classification Search
CPC ................... E04B 2001/2424; Y10T 403/3906
USPC ....... 403/87, 188; 269/254 CS, 55, 60, 289 R
See application file for complete search history.

(56) References Cited

U.S. PATENT DOCUMENTS

| | | | | |
|---|---|---|---|---|
| 761,767 | A * | 6/1904 | Hayden | 269/154 |
| 883,853 | A * | 4/1908 | Barnett | 101/284 |
| 1,221,317 | A * | 4/1917 | Haller | 144/288.5 |
| 1,312,767 | A * | 8/1919 | Swartz | 269/254 R |
| 1,416,230 | A * | 5/1922 | Oliver | 269/43 |
| 1,769,571 | A * | 7/1930 | Groehn et al. | 269/74 |
| 2,003,845 | A * | 6/1935 | Whitcomb | A63F 9/1044 273/157 R |
| 2,057,202 | A * | 10/1936 | Mead | 30/36 |
| 2,117,055 | A * | 5/1938 | Davis | D05C 1/02 38/102.6 |
| 2,228,645 | A * | 1/1941 | Schmitz | D06C 3/00 38/102.6 |
| 2,359,249 | A * | 9/1944 | Scheer | 269/55 |
| 2,535,630 | A * | 12/1950 | Gartner et al. | 269/37 |
| 2,576,003 | A * | 11/1951 | Dry | 269/46 |

(Continued)

FOREIGN PATENT DOCUMENTS

| | | |
|---|---|---|
| GB | 461953 | 2/1937 |
| WO | 94/05918 | 3/1994 |

OTHER PUBLICATIONS

British Search Report dated Nov. 22, 2012, corresponding to the Foreign Priority Application No. GB1204607.4.

*Primary Examiner* — Victor MacArthur
(74) *Attorney, Agent, or Firm* — Young & Thompson

(57) ABSTRACT

A clamp assembly for securing together in a superimposed relationship two elongate members each having a pair of opposite edge regions, includes a clamping frame having four frame members, the frame members of a first pair of the frame members being spaced apart by a second pair and the frame members of the second pair being spaced apart by the first pair, the second pair allowing the spacing of the frame members of the first pair to be varied whereby the first pair may be brought into contact with opposite edge regions of a first of the elongate members and/or the first pair allowing the spacing of the frame members of the second pair to be varied whereby the second pair may be brought into contact with opposite edge regions of the second of the elongate members, the two pairs of frame members being interconnected by first connection elements.

20 Claims, 2 Drawing Sheets

(56) References Cited

U.S. PATENT DOCUMENTS

| | | | | |
|---|---|---|---|---|
| 2,689,412 A * | 9/1954 | Young | | 269/19 |
| 2,732,868 A * | 1/1956 | Barta | | 269/55 |
| 2,881,645 A * | 4/1959 | Kruchten | | 269/182 |
| 3,568,799 A * | 3/1971 | Bivins | | F01M 9/10 |
| | | | | 123/195 C |
| 3,639,948 A * | 2/1972 | Sherman | | 24/632 |
| 3,811,209 A * | 5/1974 | Hanley | | D05C 1/02 |
| | | | | 38/102.6 |
| 4,102,374 A * | 7/1978 | Klein | | 144/346 |
| 4,157,876 A * | 6/1979 | DiGiulio | | 403/90 |
| 4,270,426 A * | 6/1981 | Raphael | | 83/410.9 |
| 4,530,493 A * | 7/1985 | Break | | 269/93 |
| 4,645,391 A * | 2/1987 | Fallert | | 409/225 |
| 4,693,155 A * | 9/1987 | Ledford, Jr. | | 83/410 |
| 4,772,000 A * | 9/1988 | Aubert | | 269/137 |
| 5,114,283 A * | 5/1992 | Fulton | | 408/103 |
| 5,244,193 A * | 9/1993 | Hehr | | 269/99 |
| 5,749,621 A * | 5/1998 | Smith | | 296/219 |
| 6,604,306 B1 * | 8/2003 | Burroughs | | D05C 1/02 |
| | | | | 38/102.4 |
| 7,753,352 B2 * | 7/2010 | Yu et al. | | 269/289 R |
| 8,246,266 B2 * | 8/2012 | Lang et al. | | 403/87 |
| 2013/0243522 A1 * | 9/2013 | Jordan | | 403/188 |
| 2014/0093307 A1 * | 4/2014 | Zhang | | 403/188 |

* cited by examiner

CLAMP ASSEMBLY

FIELD OF THE INVENTION

This invention relates to a clamp assembly for use in securing together two components and in particular, though not exclusively, two structural members such as I section girders or elongate plates.

BACKGROUND OF THE INVENTION

To enable two I section steel girders to be structurally interconnected on site, and without the need for the inconvenience of on-site drilling and welding, it has been known for decades to provide a clamp location plate which is positioned in an interposed manner between confronting surfaces of the two girders. The location plate has length and breadth dimensions greater than the respective widths of the two beam flanges such that the four corner regions of the plate lie exposed when the central region of the plate is sandwiched between said confronting surfaces. The corner regions typically are pre-drilled such that they can each locate a clamping device that extends through a respective corner hole to engage with surfaces of the flanges and effect a structural interconnection therebetween.

Although the interposed location plate enables a strong structural interconnection to be achieved, it suffers two disadvantages. One is that it does not allow the two interconnected members to be positioned in direct contact with one another, and thus may undesirably add to the space envelope of a girder assembly. The other disadvantage is that the location plate needs to be drilled with the four holes at positions specifically suitable for enabling the plate to be used with girders of a particular size. Thus in general a plurality of differently sized plates may be required, and on-site adjustment is not facilitated.

In an attempt to enable two girders to be assembled in a flush fit manner, i.e. to avoid the need for two girders to be separated by an interposed location plate, and to facilitate on-site adjustments, it has been proposed to provide a beam fixing device comprising four clamping plates and four threaded fasteners.

SUMMARY OF THE INVENTION

In particular it has been proposed to provide a fixing device for clamping together first and second overlapping plates, such as flanges of I section girders having respective first and second pairs of opposed connecting edges which intersect at four corner regions, said fixing device being operative to clamp the second plate to said connecting edges of the first plate and to clamp the first plate to said connecting edges of the second plate, and said fixing device comprising a set of four elongate clamping plates each positionable along a respective one of said connecting edges of one of said plates and of a length to project axially beyond the opposed connecting edges of the other of said plates whereby each end of each clamping plate is positionable over a respective one of said corner regions, slots being formed through each clamping plate and extending generally parallel to the axis thereof so as to overlie said corner region, and a set of four threaded fasteners each being capable of being taken though a slot of one clamping plate at one corner region and though a slot of an underlying clamping plate at the same corner region, each fastener being adjustable along the length of the respective slot until it reaches a required position in the respective corner region and then being tightenable in order to clamp the clamping plates together, whereby a respective threaded fastener is positionable and then tightenable at each corner region in order to clamp together the overlapping plates by the four clamping plates.

A fixing device of the type described in the preceding paragraphs is described in more detail in the specification of International Patent publication WO 9405918A1.

Although a beam fixing device as described in WO 9405918A1 facilitates a flush fitting structural interconnection of two girders it does not lend itself to ease of on-site assembly. Thus the installer finds it necessary to hold two of the clamping plates in position with one hand whilst installing the threaded fasteners with the other hand.

Typically the four clamping plates are each in the form of steel forgings and provided with textured surfaces in an attempt to minimise any tendency for the adjacent plates to slide readily relative to one another during assembly. However the forged steel construction adds to the cost of manufacture.

The present invention seeks to provide an improved clamp assembly and a clamp frame for securing together two members, such as two elongate plates or girders, in a superimposed relationship in which the two members may be in direct contact with one another and wherein on-site assembly may be effected more readily than with hitherto known devices. The present invention seeks also to provide a clamp assembly and a clamp frame of a kind which may be manufactured more economically without the need for forging of component parts.

In accordance with one aspect of the present invention there is provided a clamp assembly for use in securing together in a superimposed relationship two elongate members each having a pair of opposite edge regions, said clamp assembly comprising a clamping frame comprising four frame side members, the frame members of a first pair of the frame members being maintained spaced apart by a second pair of frame members and the frame members of the second pair of frame members being maintained spaced apart by the first pair of frame members, the second pair of frame members allowing the spacing of the frame members of the first pair to be varied whereby the first pair may be brought into contact with or positioned close to respective opposite edge regions of a first of the elongate members and/or the first pair of frame members allowing the spacing of the frame members of the second pair to be varied whereby the second pair may be brought into contact with or positioned close to respective opposite edge regions of the second of the elongate members, the two pairs of frame members being interconnected by first connection means which acts solely between the frame members to hold adjacent frame members in contact with one another whilst also permitting relative sliding movement as the spacing of at least one of the first and second pairs is adjusted to correspond with or be close to the width of one of the two elongate members, and the two frame members of at least one of the first and second pairs each having a slot-like formation which extends in the direction of the length of the frame member and through which a beam clamp may extend to engage with the two elongate members and be tightened to secure said elongate members relative to one another.

Preferably each of the first and second pairs of frame members allows the spacing of the frame members of the other of the two pairs to be varied.

Preferably the two frame members of each of the first and second pairs of frame members are each provided with a slot-like formation through which a beam clamp may extend to engage with the two elongate members.

Preferably each of the frame members is provided with two slot-like formations through each of which a beam clamp may extend, each slot-like formation extending parallel with the length of the frame member.

Although the clamp frame may comprise a first pair of side members arranged with one of the members of the pair lying over the two members of the second pair and the other member of the pair lying beneath the two members of the second pair, the invention particularly envisages that the two side members of the first pair will each lie over the two side members of the second pair.

Each frame member may be comprised by a flat metal plate. Said plate may be stamped or machined to provide the slot-like formation(s). Each plate may have a thickness substantially equal to the thickness of at least one, or a part, of the two elongate structural members between which the beam clamps are to act. The clamp assembly and frame may be designed for use with a range of elongate structural members having edge regions of different thicknesses, and the thickness of the plates may be selected to correspond with an average or the maximum or the minimum thickness of at least one of said edge regions between which the beam clamps are to act. However it is to be understood that it is not essential to relate the thickness of a frame member plate to the thickness of a part of one or each of the members that are to be interconnected provided that the beam clamp is of a kind which is able to be adjusted to accommodate a difference in thicknesses.

Preferably each frame member is provided with two slot-like formations through each of which a beam clamp may extend, each slot-like formation extending substantially parallel with the length of the frame side member and the two slot formations being aligned with one another in the direction of the length of the frame member. The slots may be open ended, to extend to respective end regions of the frame member and may be spaced apart at a position substantially midway between the ends of the frame member. More preferably, however, the slots are each of as closed type such that the material of the frame member at each of the longitudinal edges thereof is interconnected both at end regions of the frame member and at a position substantially midway between the ends thereof. Alternatively a frame member may be provided with a single lengthwise extending slot for location of two beam clamps, the ends of the slot being closed such that the material of the frame member at each of the longitudinal edges thereof is interconnected solely at end regions of the frame member.

The first connection means may comprise four resilient connectors provided one each at the four positions at which one frame member lies superimposed over another of the frame members. An example of a suitable resilient connector is a nut and bolt assembly where the bolt has a length greater than the thickness of the two frame members and is provided in association with a compression spring which acts between either the nut or bolt head and one of the frame members, or a washer interposed between the spring and a frame member, thereby to provide a bias force which maintains the frame members in contact. The frame members preferably are provided with slots to enable the bolts of the resilient connectors to extend therethrough and to permit relative sliding movement of the frame members in the direction of the length of the slots. Preferably said slots extend each in a direction of the length of the frame member.

Preferably each frame member is of a reversible type comprising two identical slot formations such that either of the slot formations may be utilised for positioning of a beam clamp or positioning of a resilient connector or other first connection means.

Although it is envisaged that the first connection means preferably comprises resilient connectors as aforedescribed, it is to be understood that other connection means may be provided and need not necessarily be of a resilient type. Thus, for example, at least some of the frame members, referred to herein also as frame side members, may be provided with edge formations which lie folded around edges of another of the side members such that the frame side members are held against separation but are able to slide relative to one another. The folded material may exert sufficient force to restrain free sliding movement, or separate means, such as a nut and bolt may be provided at each corner region to enable the frame members to be secured relative to one another by tightening of the nut and bolt. Said sliding movement may be restrained by providing confronting surfaces which are textured, for example with small serrations which extend perpendicular to the direction of sliding movement.

Although the present invention teaches that the first connection means is to act solely between the frame members, such that the first connection means does not provide any force which acts directly on the elongate members, the invention envisages that optionally the first connection means may be of a type which may be tightened to secure the frame side members firmly relative to one another and then resist any relative sliding movement.

BRIEF DESCRIPTION OF THE DRAWINGS

One embodiment of the present invention will now be describes, by way of example only, with reference to the accompanying diagrammatic drawings in which:—

DETAILED DESCRIPTION OF THE INVENTION

Figure 1:
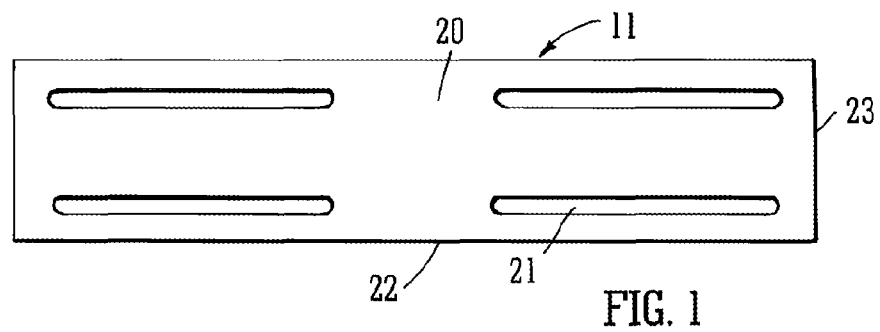
FIG. 1 is a plan view of a frame side member of a clamp assembly in accordance with the present invention.
Figure 3:
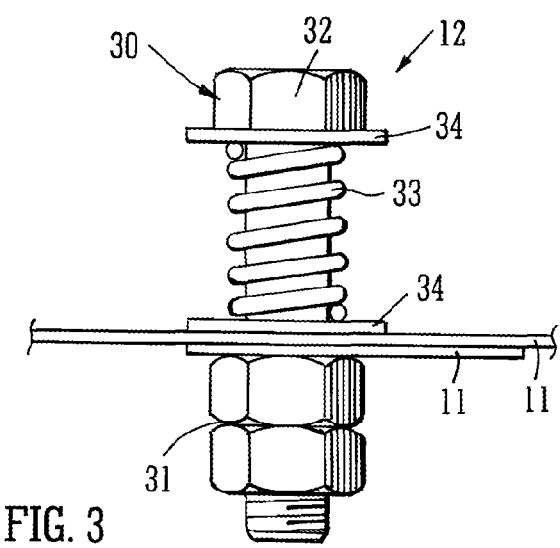
FIG. 3 is a side view of one of the first connection means of FIG. 2 and shown in situ.
Figure 6:
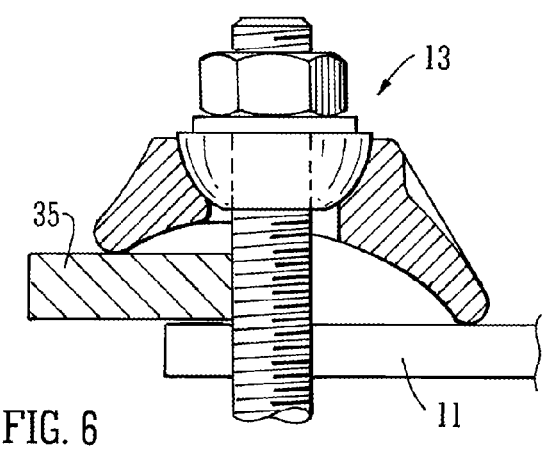
FIG. 6 is a side view of a beam clamp of the type shown in the assembly of FIG. 5.

A clamp assembly in accordance with the present invention comprises four frame side members 11 (see FIG. 1), four resilient connectors 12 (see FIG. 3) and four beam clamps 13 (see FIG. 6).

Each frame side member 11 comprises a flat steel plate 20 formed with four elongate slots 21.

The four slots extend parallel with the direction of the length of the side member and are symmetrically disposed to lie two each side of a longitudinal axis midway between side edges 22 of the frame side member and to lie symmetrically two either side of a transverse axis which extends perpendicular to the length of the side member at a position midway between the ends 23 of the side member. In use for forming a clamp frame two of the slots 21 adjacent one of the side edges 22 are employed to receive first connection means in the form of the resilient clamps 12, leaving the two slots adjacent the other longitudinal edge 22 available for location of beam clamps 13.

Figure 2:
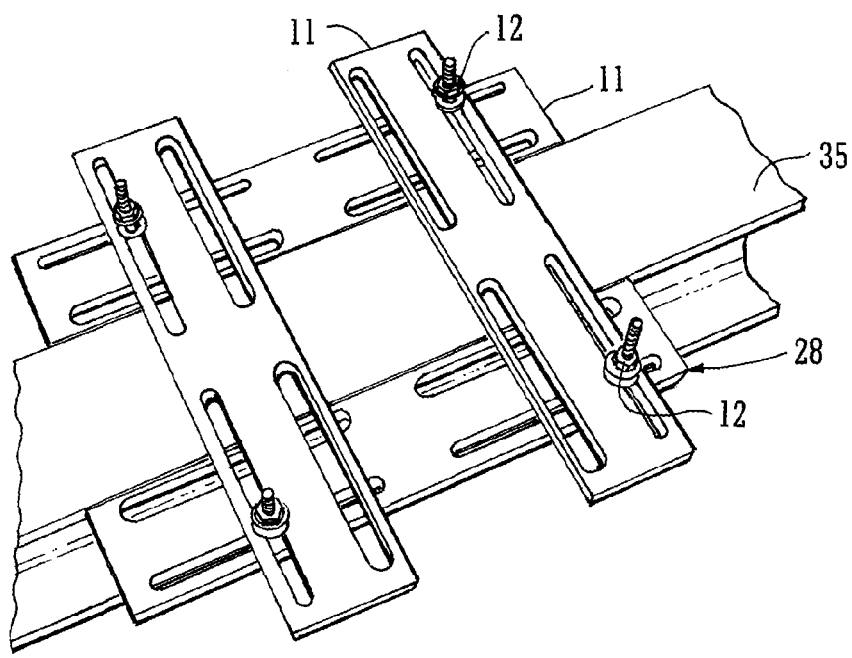
FIG. 2 is a perspective view showing a clamp frame in position with one of two elongate structural members that are to be interconnected.

For use in securing two I section girders relative to one another in an overlapping relationship with one girder extending, for example, at right angles to the other, the four frame side members 11 are interconnected by means of the resilient connectors 12 to form a generally square shaped clamp frame 28 as shown in FIG. 2. The resilient connectors 12 are positioned in those slots that lie outwards of the frame, leaving the slots that lie relatively inwards available for positioning of the beam clamps 13. The clamp frame typically is pre-assembled by the manufacturer of the clamp frame, thus minimising on-site assembly work.

Each of the resilient connectors 12 comprises a bolt 30 and a lock nut 31. The bolt head 32 and nut 31 hold captive therebetween two frame side members 11 and a compression spring 33 positioned between two washers 34. One washer bears against the bolt head and the other against one of the frame side members 11. The compression spring 33 exerts a force which holds the two side members 11 against one another so as to provide resistance to but allow relative sliding movement.

Figure 4:
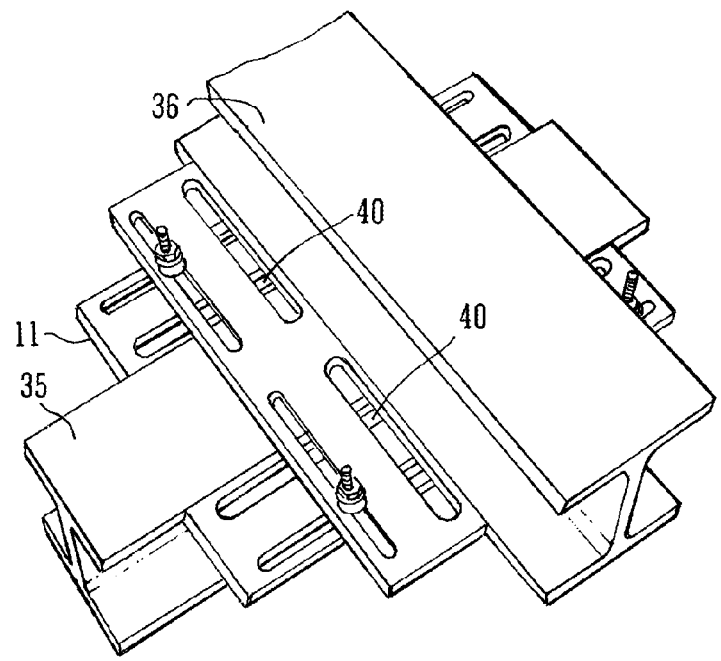
FIG. 4 is a view similar to that of FIG. 2 but with a second elongate member in position.
Figure 5:
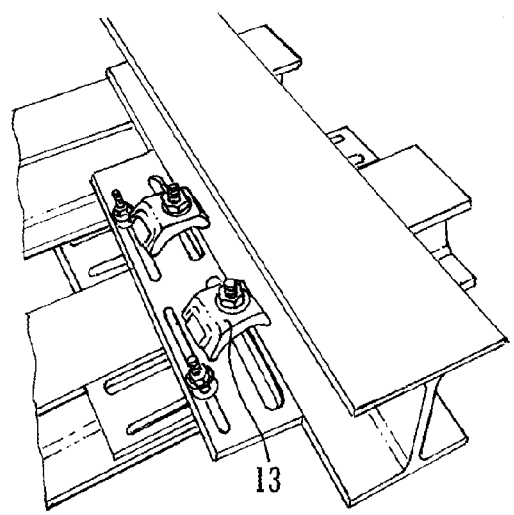
FIG. 5 corresponds with that of FIG. 4 but with the addition of beam clamps.

In use, two of the side members at opposite sides of the frame are slid relative to the other two side members such that the first edges of the edges 22 of the first two side members abut edges of one 35 of the I section beam flanges, as shown in FIG. 2. The other I section beam 36 is then placed in position over the first beam and the other two side frame members are then slid towards one another such that their inner edges 22 abut edges of the I section beam lower flange. In this position the inner slots of the side frame member define four apertures 40 (see FIG. 4) through which beam clamp bolts 13 (see FIG. 6) may then conveniently be fitted and tightened to bear firmly against the beam flanges in known manner, as shown in FIG. 5.

From the foregoing it will be understood that the clamp frame is readily adjusted in size and position to bring edges of the frame into contact with the respective edges of the girders, and that the frame members will be self-supporting in that position such that an operative may readily then fit and tighten the beam clamps 13. Thus ease of on-site assembly is facilitated.

Although the invention has been described specifically for use in connecting two girders at right angles relative to one another it will be appreciated that the frame need not be of a square shape and may be deformed readily to that of a parallelogram for use when two structural members are to be secure obliquely relative to one another.

The clamp assembly frame may also be employed for securing together two elongate members, such as two I section beams, in a manner in which they extend parallel with one another, in this case two of the frame members being positioned to extend between and space apart confronting surfaces of the two elongate members.

The invention claimed is:

1. A clamp assembly configured to secure together in a superimposed relationship two elongate members each having a pair of opposite edge regions, said clamp assembly comprising:
   a clamping frame comprising a first pair of frame side members and a second pair of frame side members which form a four sided frame, each frame side member being a flat metal plate, each flat metal plate of at least one of the first and second pairs of frame side members comprising a pair of slot formations that extend parallel with one another in a side-by-side relationship;
   a plurality of first connection devices;
   at least one beam clamp for extending through two said frame side members to engage with an elongate member;
   the frame side members of said first pair of the frame side members being spaced apart by said second pair of the frame side members, and the frame side members of the second pair of frame members being spaced apart by the first pair of frame side members, whereby the frame comprises four positions at which one frame side member lies superimposed over another frame side member;
   the plurality of first connection devices comprising four connection devices provided one at each of the four positions at which one flat metal plate lies superimposed over another of the flat metal plates and each first connection device extended through two plates for securing the two plates together;
   the frame side members of at least one of the two pairs of frame side members allowing the spacing of the frame side members of the other of the two pairs of frame side members pair to be varied whereby said other pair may be brought into contact with or positioned close to respective said opposite edge regions of one of the elongate members;
   the first and second pairs of frame side members being interconnected by said first connection devices which act solely between the frame side members to hold adjacent frame side members in contact with one another while permitting relative sliding movement as the spacing of at least one of the first and second pairs is adjusted to correspond with or be close to the width of one of the two elongate members, said first connection devices being positioned to secure each frame side member of one of the pairs to each of the frame side members of the other of said pairs.

2. The clamp assembly according to claim 1 wherein each of the first and second pairs of frame side members allows the spacing of the frame members of the other of the two pairs to be varied.

3. The clamp assembly according to claim 1 wherein the frame members of each of the first and second pairs of frame side members are provided with said slot formation through which said beam clamp may extend to engage with the two elongate members.

4. The clamp assembly according to claim 1 wherein each of the frame members is provided with a pair of slot formations that extend parallel with one another in a side-by-side relationship, each slot formation extending substantially parallel with the length of the frame side members.

5. The clamp assembly according to claim 4 wherein at least one of the slot formations of a frame member extends to an end region of the frame side member.

6. The clamp assembly according to claim 5 wherein at least one frame side members comprises a pair of slot formations which extend to respective end regions of the frame and are spaced apart at a position substantially midway between the ends of the frame side member.

7. The clamp assembly according to claim 1 wherein at least one of the slot formations is closed whereby material of the frame side member at a longitudinal edge thereof is interconnected both at an end region of the frame side member and at a position substantially midway between the ends thereof.

8. The clamp assembly according to claim 7 wherein at least one of the frame members comprises a pair of closed type slot formations which extend substantially parallel with the length of the frame side member with the material of the frame member at each of the longitudinal edges thereof being interconnected both at end regions of the frame side member and at a position substantially midway between the ends thereof.

9. The clamp assembly according to claim 1 wherein each first connection device is a resilient connector, and four resilient connectors are provided one at each of the four positions at which one frame side member lies superimposed over another of the frame side members.

10. The clamp assembly according to claim 9 wherein at least one of the resilient connectors comprises a nut and bolt assembly provided with a compression spring to act between either the nut or bolt head and one of the frame members to provide a bias force which maintains the frame side members in contact.

11. The clamp assembly according to claim 9 wherein the frame side members are provided with slot formations to enable the resilient connectors to extend therethrough and permit relative sliding movement of the frame side members in the direction of the length of the slot formations.

12. The clamp assembly according to claim 1 wherein each frame side member is reversible comprising two identical slot formations such that either of the slot formations may be utilised for positioning of a beam clamp or positioning of the first connection device.

13. The clamp assembly according to claim 1 wherein the first connection device is operable to secure the frame side members firmly relative to one another and then resist any relative sliding movement.

14. A structural assembly comprising the clamp assembly according to claim 1 and said two elongate members, said clamp assembly being arranged to provide a structural interconnection between said elongate members, whereby said elongate members are secured together in a superimposed relationship.

15. The structural assembly according to claim 14 wherein the two elongate members are secured together in contact with one another.

16. The structural assembly according to claim 14 wherein confronting surfaces of the two elongate members are spaced apart by two of the clamp frame members.

17. The clamp assembly according to claim 1 wherein the first connection devices and the at least one beam clamp extend through the plates in parallel with each other.

18. A clamp assembly configured to secure together in a superimposed relationship two elongate members each having a pair of opposite edge regions, said clamp assembly comprising:
a clamping frame comprising a first pair of frame side members and a second pair of frame side members which form a four sided frame, each frame side member being a flat metal plate, each flat metal plate of at least one of the first and second pairs of frame side members comprising a pair of slot formations that extend parallel with one another in a side-by-side relationship;
a plurality of first connection devices;
at least one beam clamp for extending through two said frame side members to engage with an elongate member,
the frame side members of a first pair of the frame side members being maintained spaced apart by a second pair of frame side members and the frame side members of the second pair of frame side members being maintained spaced apart by the first pair of frame side members, whereby the frame comprises four positions at which one frame side member lies superimposed over another frame side member;
the plurality of first connection devices comprising four connection devices provided one at each of the four positions at which one flat metal plate lies superimposed over another of the flat metal plates and each first connection device extended through two plates for securing the two plates together;
said second pair of frame side members allowing the spacing of the frame side members of said first pair to be varied whereby the first pair may be brought into contact with or positioned close to respective said opposite edge regions of a first of the elongate members and the first pair of frame side members allowing the spacing of the frame side members of the second pair to be varied independently of the spacing of the first pair whereby the second pair may be brought into contact with or positioned close to respective said opposite edge regions of the second of the elongate members,
the first and second pairs of frame side members being interconnected by said first connection devices which act solely to hold adjacent frame members in contact with one another, while permitting relative sliding movement as the spacing of at least one of the first and second pairs is adjusted to correspond with or be close to the width of one of the two elongate members, said first connection devices being positioned to secure each frame side member of one of the pairs to each of the frame side members of the other of said pairs.

19. The clamp assembly according to claim 18 wherein the first connection devices and the at least one beam clamp extend through the plates in parallel with each other.

20. A clamp assembly configured to secure together in a superimposed relationship two elongate members each having a pair of opposite edge regions, said clamp assembly comprising:
a clamping frame comprising a first pair of frame side members and a second pair of frame side members which form a four sided frame, each frame side member being a flat metal plate, each flat metal plate of at least one of the first and second pairs of frame side members comprising a pair of slot formations that extend parallel with one another in a side-by-side relationship;
a plurality of first connection devices;
at least one beam clamp for extending through two said frame side members to engage with an elongate member,
the frame side members of a first pair of the frame side members being maintained spaced apart by a second pair of frame side members and the frame side members of the second pair of frame side members being maintained spaced apart by the first pair of frame side members, whereby the frame comprises four positions at which one frame side member lies superimposed over another frame side member;
the plurality of first connection devices comprising four connection devices provided one at each of the four positions at which one flat metal plate lies superimposed over another of the flat metal plates and each first connection device extended through two plates for securing the two plates together;
said second pair of frame side members allowing the spacing of the frame side members of said first pair to be varied whereby the first pair may be brought into contact with or positioned close to respective said opposite edge regions of a first of the elongate members and the first pair of frame side members allowing the spacing of the frame side members of the second pair to be varied independently of the spacing of the first pair whereby the second pair may be brought into contact with or positioned close to respective said opposite edge regions of the second of the elongate members, the first and second pairs of frame side members being interconnected by said first connection devices which act solely to hold adjacent frame side members in contact with one another, while permitting relative sliding movement as the spacing of at least one of the first and second pairs is adjusted to correspond with or be close to the width of one of the two elongate members, said first connection devices being positioned to secure each frame side member of one of the pairs to each of the frame side members of the other of said pairs and the two frame side members of at least one of the first and second pairs each having said slot formation which extends in the direction of the length of the frame member and through which said beam clamp may extend to engage with the two elongate members and be tightened to secure said elongate members relative to one another, wherein at least one of the slot formations is closed whereby material of the frame member at a longitudinal edge thereof is interconnected both at an end region of the frame member and at a position substantially midway between the ends thereof.

\* \* \* \* \*